F. L. WATROUS.
TRIPOD.
APPLICATION FILED MAR. 11, 1910.
992,395.
Patented May 16, 1911.
2 SHEETS—SHEET 1.
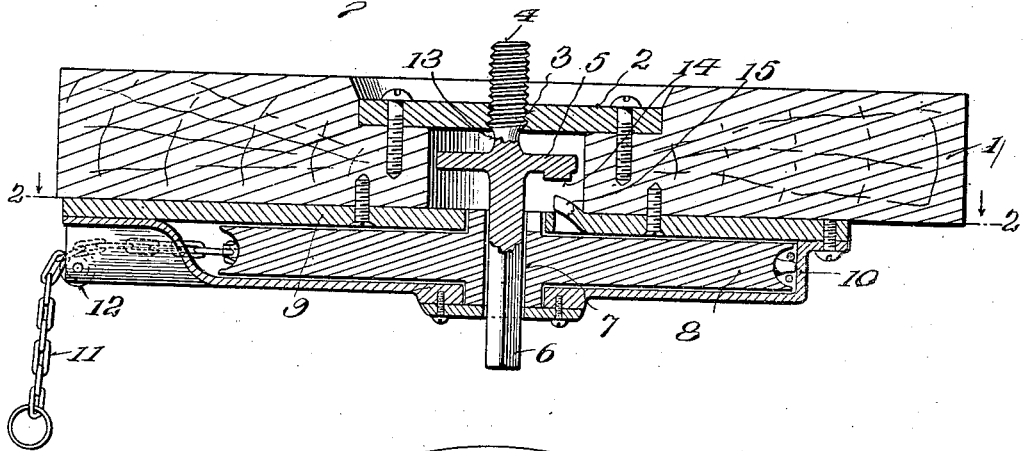
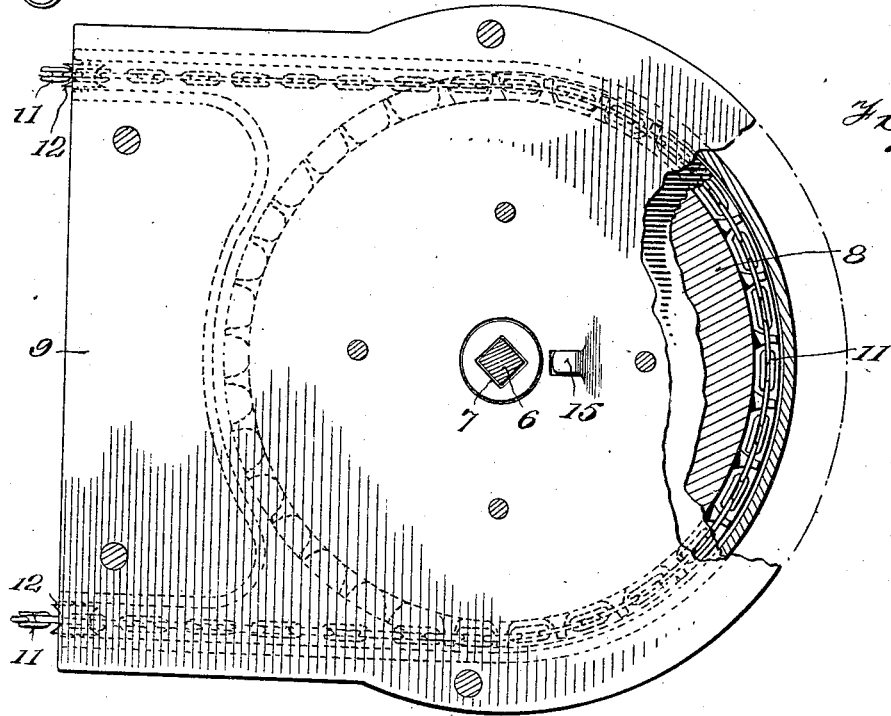
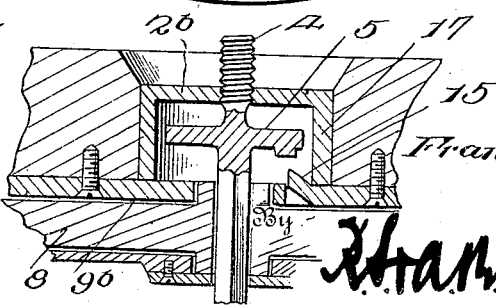
Witnesses
Inventor
Frank L. Watrous
By
Attorneys

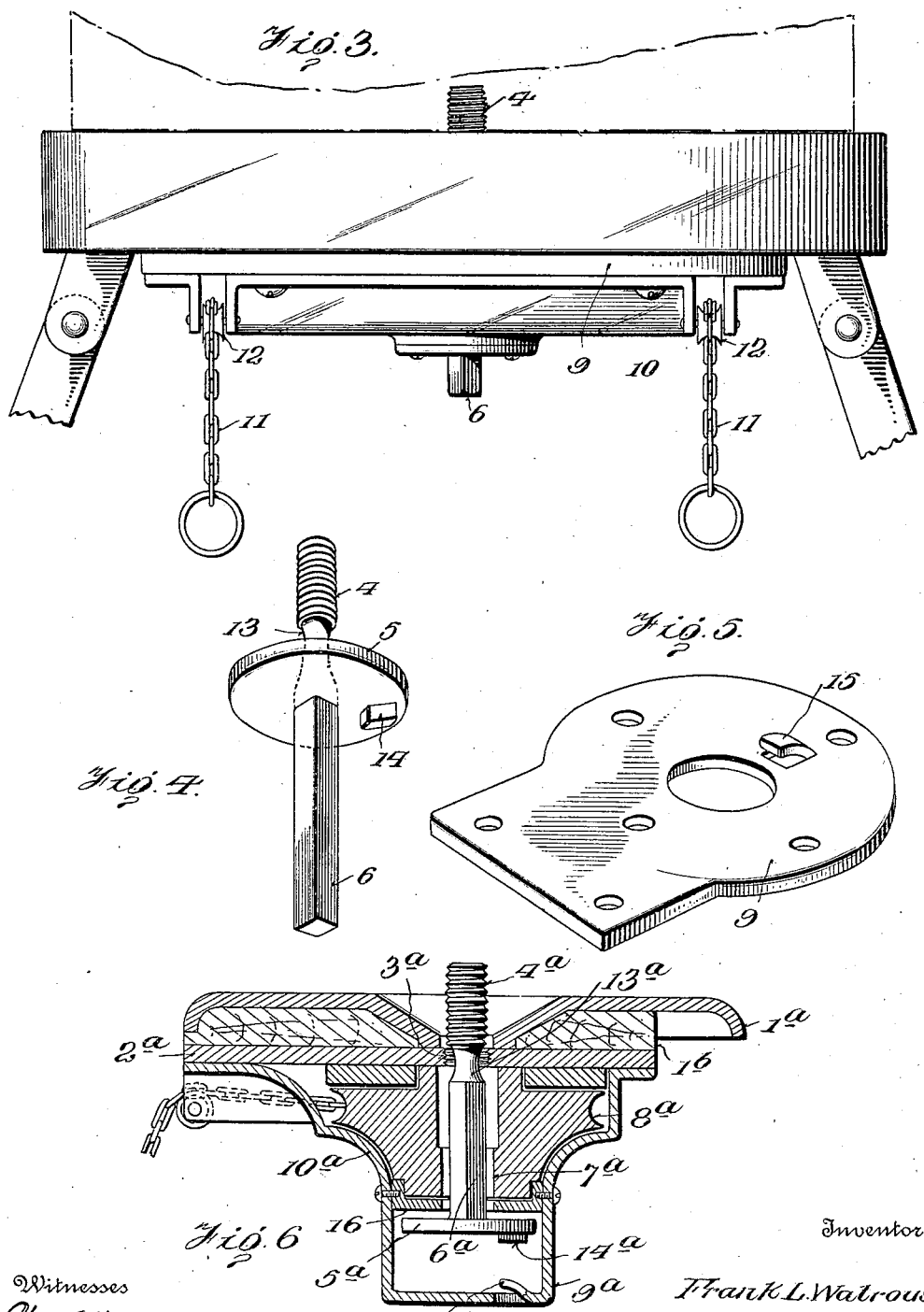

UNITED STATES PATENT OFFICE.

FRANK L. WATROUS, OF FOREST GROVE, OREGON.

TRIPOD.

992,395.

Specification of Letters Patent. Patented May 16, 1911.

Application filed March 11, 1910. Serial No. 548,684.

*To all whom it may concern:*

Be it known that I, FRANK L. WATROUS, a citizen of the United States, residing at Forest Grove, in the county of Washington and State of Oregon, have invented certain new and useful Improvements in Tripods, of which the following is a specification.

This invention comprehends certain new and useful improvements in tripods for use in holding cameras or other instruments, and the invention has for its primary object a simple, durable and efficient construction of tripod screw whereby the operation of attaching or detaching the camera or the like may be accomplished by a single motion, simply pulling upon a wire or cable forming one of the elements of the apparatus.

The invention also has for its object a device of this character which will effectually prevent the loss of the attaching tripod screw, which avoids the necessity of directly grasping the screw thereby precluding the liability of upsetting the tripod or overcoming the balance of the same, it being well known that very little room is provided at the head of a tripod for direct manipulation of the screw and which will be particularly useful to field and newspaper photographers and others to whom speed is a desideratum, owing to the fact that the camera, for instance, may be quickly set up and removed.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawing in which:

Figure 1 is a diagrammatic sectional view of my device; Fig. 2 is a horizontal section on the line 2—2 of Fig. 1. Fig. 3 is a side elevation of the device; Fig. 4 is a detail perspective view of the attaching screw; Fig. 5 is a similar view of a portion of the casing; and, Figs. 6 and 7 sectional views of modifications.

Corresponding and like parts are referred to in the following description and accompanying drawings by the same reference characters.

In one embodiment of my invention illustrated in Figs. 1 to 5, 1 designates the head of the tripod which is formed with a central depression in which a plate 2 is held as by screws or similar fastening devices. The plate 2 is formed with a screw threaded opening 3 in which the attaching screw 4 works. This screw is formed below the plate 2 with a disk 5 and below the disk with a downwardly projecting noncircular shank 6 which fits within a correspondingly shaped opening 7 formed in the center of the horizontally disposed sprocket wheel 8. The sprocket wheel 8 is mounted to rotate about a vertical axis in a casing of which one part is formed by a plate 9 secured by screws or the like to the lower face of the head 1, and by a flanged housing 10 secured to the plate 9 in any desired way. The casing is provided at its center with an opening in which the upwardly and downwardly projecting portions of the head of the sprocket wheel 8 are journaled so as to minimize the friction between the plate and the body portion of the sprocket wheel and the adjacent walls of the casing. A chain or cable 11 is passed into and out of the casing and around the sprocket wheel 8 so that by pulling upon either end of the chain the wheel may be turned in one direction or the other, the ends of the chain being preferably provided with finger rings and passing over the pulleys 12 journaled in the casing as clearly illustrated in the drawings.

From the foregoing description in connection with the accompanying drawing, it will be understood that by pulling upon the end of the chain 11 and turning the wheel 8 in one direction, the screw 4 will be turned and moved in an upward direction in the opening 3 of the plate 2 so as to enter and be engaged in the threaded socket of the camera or other instrument. It is to be particularly noted that at the base of its threaded portion, the attaching screw 4 is formed with an annular depression 13; hence the turning of the sprocket 4 in a direction to move upwardly in the threaded opening 3 will finally cause the depression 13 to be presented to the threaded opening 3 of the plate 2 whereupon the screw may be rotated without any further upward movement and the camera or the like drawn tightly down upon the head 1.

In order to detach the camera or the like, it is only necessary to pull upon the other end of the chain 11 so as to cause the screw 4 to move downwardly in the opening 7 of the wheel 8. It is to be noted that the disk 5 of the screw is formed on its lower face with a lug 14 and in the downward movement of the screw 4 this lug will finally come into contact with a projection 15 struck up from or otherwise formed on or secured to the plate 9. This will limit the movement of the screw 4 in a downward direction, the parts being so arranged that when the movement is thus limited the threads of the screw will still be in engagement with the threads of the opening 3 so that the parts can never become detached.

As one of the ends of the cable 11 will always be shorter than the other after the screw has been fully turned in one direction or the other to attach or detach the instrument to or from the tripod, the operator will know that it is only necessary to pull upon the short end of the cable to impart an opposite movement to the screw. That is to say, if the camera or the like has been attached to the head 1 of the tripod, and it is desired to remove it, the operator will know that by pulling upon the short end of the chain the disengaging operation will be effected.

It is to be understood that my invention is not limited to the exact construction, arrangement and proportions of parts hereinbefore described or illustrated in Figs. 1 to 5 but that various changes, or modifications may be made without departing from the spirit of the invention as defined in the appended claims. For example, reference is to be had to Fig. 6 in which a modification is illustrated. In this form of the device the invention is particularly adapted to metal tripods, 1$^a$ designating the metal head of the tripod which if desired may be reinforced by a wooden base 1$^b$, 2$^a$ designates the plate which is formed with the threaded openings 3$^a$ for the attaching screw 4$^a$. The screw is provided with a non-circular shank 6$^a$ which projects downwardly through a correspondingly shaped opening 7$^a$ in a sprocket wheel 8$^a$. The sprocket wheel 8$^a$ is mounted in a casing which includes a housing 10$^a$ and a horizontally disposed partition 16 which forms the lower bearing for the sprocket wheel. The shank 6$^a$ of the screw extends down through the plate 16 into the lower extension 9$^a$ of the housing, and is formed at its lower end with a disk 5$^a$ having a nib 14$^a$ adapted to coact with a lug or projection 15$^a$ struck up from the bottom of the extension 9$^a$. Like the screw 4, the screw 4$^a$ is formed below its threaded portion with an annular depression 13$^a$. As the operation of this form of the invention is substantially like that of the embodiment illustrated in Fig. 1, further description of the operation is deemed unnecessary.

In that embodiment of the invention illustrated in Fig. 7, the top plate designated 9$^b$ may be connected in any desired way as by solder to the circular web or rim 17 which is formed integrally with the plate 2$^b$ in which the screw 4 works.

Obviously the chain 11 may be continuous or endless by joining together the ends to which the finger rings are shown attached in the accompanying drawings.

Having thus described the invention, what is claimed as new is:

1. A tripod head, a screw working therein, a wheel supported by the head and formed with an opening, the screw being provided with a shank movable freely in said opening in a direction longitudinally of the screw, but arranged to engage the wall of said opening upon the rotation of the wheel, whereby to prevent the independent rotation of the wheel and shank, and means for turning said wheel.

2. A tripod head, a plate embodied therein and formed with a screw threaded opening extending therethrough, a screw working in said opening, a casing secured to the head underneath the same, a sprocket wheel mounted in said casing and formed with a central non-circular opening, the screw being formed with a non-circular shank extending in a longitudinal direction in said opening and fitting therein for a longitudinal movement, but prevented from turning in said opening by the corresponding shape of the opening and shank, and a chain extending around the sprocket wheel, the ends of the chain extending out of the casing.

3. A tripod head, embodying a plate formed with a threaded opening, a screw working in said opening and formed with a non-circular shank, a wheel carried by the head and formed with a non-circular opening conforming to the non-circular shank, the latter being movable freely in the opening in the wheel in a direction longitudinal of the screw, the screw being formed between its threaded portion and the shank with a disk, said disk being formed with a lug, and the head being provided with a projection designed for engagement by said lug.

4. A tripod head embodying a plate formed with a threaded opening, a screw working in said opening and formed below the plate with a lug, the head also embodying a projection adapted to be engaged by the lug to limit the movement of the screw in one direction.

5. A tripod head embodying a plate formed with a threaded opening, a screw working in said opening and formed at the base of its threaded portion with an annular depression and below said depression with a disk, said disk being formed on its lower face with a lug, the head embodying a projection designed for engagement by said lug.

6. A tripod head, a screw mounted therein, a wheel supported by the head and formed with a centrally disposed square opening, the screw being provided with a square shank movable longitudinally in said opening, and means for turning said wheel.

In testimony whereof I affix my signature in presence of two witnesses.

FRANK L. WATROUS. [L. S.]

Witnesses:
 Jo N. Hoffman,
 M. R. Markham.

---

Copies of this patent may be obtained for five cents each, by addressing the "Commissioner of Patents, Washington, D. C."